US009722936B2

(12) United States Patent
Zhou et al.

(10) Patent No.: US 9,722,936 B2
(45) Date of Patent: Aug. 1, 2017

(54) METHOD AND SYSTEM FOR RATE ADAPTION OF HTTP STREAM MEDIA

(71) Applicants: PEKING UNIVERSITY, Beijing (CN); PEKING UNIVERSITY FOUNDER GROUP CO., LTD., Beijing (CN); BEIJING FOUNDER ELECTRONICS CO., LTD., Beijing (CN)

(72) Inventors: Chao Zhou, Beijing (CN); Xinggong Zhang, Beijing (CN); Zongming Guo, Beijing (CN)

(73) Assignees: PEKING UNIVERSITY, Beijing (CN); PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 159 days.

(21) Appl. No.: 14/431,139

(22) PCT Filed: Sep. 9, 2013

(86) PCT No.: PCT/CN2013/083097
§ 371 (c)(1),
(2) Date: Mar. 25, 2015

(87) PCT Pub. No.: WO2014/048244
PCT Pub. Date: Apr. 3, 2014

(65) Prior Publication Data
US 2015/0244636 A1 Aug. 27, 2015

(30) Foreign Application Priority Data
Sep. 28, 2012 (CN) .......................... 2012 1 0366974

(51) Int. Cl.
G06F 15/16 (2006.01)
H04L 12/835 (2013.01)
(Continued)

(52) U.S. Cl.
CPC .............. *H04L 47/30* (2013.01); *H04L 65/60* (2013.01); *H04L 65/604* (2013.01); *H04L 67/02* (2013.01);
(Continued)

(58) Field of Classification Search
CPC ....... H04L 47/30; H04L 65/60; H04L 65/604; H04L 67/02; H04L 47/2441; H04L 65/80;
(Continued)

(56) References Cited

U.S. PATENT DOCUMENTS 8,930,559 B2 * 1/2015 Chen .................... H04L 65/4084
709/219
8,949,440 B2 * 2/2015 Grinshpun ......... H04N 21/2662
709/227

(Continued)

FOREIGN PATENT DOCUMENTS

CN 1655547 8/2005
CN 101562737 10/2009
CN 102123303 7/2011

Primary Examiner — Melvin H Pollack
(74) Attorney, Agent, or Firm — Brinks Gilson & Lione

(57) ABSTRACT

A method and apparatus for rate adaption of HTTP stream media is disclosed in this invention. The method comprises: acquiring from a server a stream media with a selected video rate at a client adopting the TCP protocol at its transmission layer and the HTTP protocol at its application layer, wherein the selected video rate allows an amount of buffered data to be maintained in a predetermined range in a buffer for buffering the stream media under a current download rate speed. This invention may improve user experience.

5 Claims, 2 Drawing Sheets

(51) Int. Cl.
  *H04N 21/24* (2011.01)
  *H04N 21/44* (2011.01)
  *H04N 21/643* (2011.01)
  *H04L 29/06* (2006.01)
  *H04L 29/08* (2006.01)
  *H04L 12/851* (2013.01)

(52) U.S. Cl.
  CPC ... *H04N 21/2401* (2013.01); *H04N 21/44004* (2013.01); *H04N 21/64322* (2013.01); *H04L 47/2441* (2013.01); *H04L 65/80* (2013.01)

(58) Field of Classification Search
  CPC ......... H04N 21/2401; H04N 21/44004; H04N 21/64322
  USPC .......................................................... 709/233
  See application file for complete search history.

(56) References Cited

U.S. PATENT DOCUMENTS

| | | | | |
|---|---|---|---|---|
| 8,954,596 | B2* | 2/2015 | Ronca | H04N 21/26258 709/230 |
| 8,959,244 | B2* | 2/2015 | Lin | 709/231 |
| 9,043,467 | B2* | 5/2015 | Kovvali | H04W 28/06 709/223 |
| 9,060,184 | B2* | 6/2015 | Dow | H04N 21/234327 |
| 9,124,757 | B2* | 9/2015 | Weber | H04N 7/141 |
| 9,125,073 | B2* | 9/2015 | Oyman | H04W 24/04 |
| 9,137,278 | B2* | 9/2015 | Strasman | H04L 29/06 |
| 9,191,284 | B2* | 11/2015 | Kordasiewicz | H04L 65/1083 |
| 9,253,233 | B2* | 2/2016 | Luby | H04N 21/23439 |
| 9,276,967 | B2* | 3/2016 | Casey | H04N 21/2662 |
| 9,276,989 | B2* | 3/2016 | Swaminathan | H04L 65/4084 |
| 9,306,994 | B2* | 4/2016 | Gahm | H04N 21/23805 |
| 9,332,050 | B2* | 5/2016 | Collard | H04L 65/607 |
| 9,372,737 | B2* | 6/2016 | Kruglikov | G06F 9/54 |
| 9,374,404 | B2* | 6/2016 | Strasman | H04L 65/4084 |
| 9,386,058 | B2* | 7/2016 | Gao | H04L 65/1083 |
| 9,398,347 | B2* | 7/2016 | Jadallah | H04L 41/5067 |
| 9,407,564 | B2* | 8/2016 | Major | H04N 21/25808 |
| 9,467,708 | B2* | 10/2016 | Soroushian | H04N 19/33 |
| 2003/0185299 | A1 | 10/2003 | Takita | |
| 2015/0026309 | A1* | 1/2015 | Radcliffe | H04L 65/602 709/219 |
| 2015/0032899 | A1* | 1/2015 | Willars | H04L 65/4076 709/231 |
| 2015/0215359 | A1* | 7/2015 | Bao | H04L 65/605 709/219 |
| 2016/0323342 | A1* | 11/2016 | Luby | H04L 65/601 |

* cited by examiner

METHOD AND SYSTEM FOR RATE ADAPTION OF HTTP STREAM MEDIA

CROSS-REFERENCE TO RELATED APPLICATIONS

The present application is a 371 national stage application of PCT International Application No. PCT/CN2013/083097, filed Sep. 9, 2013, which application claims a right of priority to Chinese Patent Application No. 201210366974.2, filed Sep. 28, 2012, both of which are incorporated herein by reference in their entirety.

TECHNICAL FIELD

The present invention relates to the field of network video transmission, and more specifically, to a method and apparatus for rate adaption of HTTP stream media.

DESCRIPTION OF THE RELATED ART

Recently, dynamic HTTP stream media transmission has been widely adopted in network video transmission. A too high video rate may cause a download rate lower than the speed of video rate, resulting to playback freeze; on the contrary, a too low video rate may cause a waste of bandwidth, with video quality deteriorated.

In existing systems, due to the time-varying characteristic of network bandwidth, how to select an appropriate video rate to maximize video quality is still a challenged problem. Thus, it is important to select an appropriate video rate.

SUMMARY OF THE INVENTION

An object of this invention is to provide a method and apparatus for rate adaption of HTTP stream media to solve the above problem.

In an embodiment of this invention, a method for rate adaption of HTTP stream media is provided, comprising: acquiring from a server a stream media with a selected video rate at a client adopting the TCP protocol at its transmission layer and the HTTP protocol at its application layer, wherein the selected video rate allows an amount of buffered data to be maintained in a predetermined range in a buffer for buffering the stream media under a current download rate.

In an embodiment of this invention, an apparatus for rate adaption of HTTP stream media is provided, comprising: a download module for acquiring from a server a stream media with a selected video rate at a client adopting the TCP protocol at its transmission layer and the HTTP protocol at its application layer; a selection module for selecting such a video rate that an amount of buffered data in a buffer for buffering the stream media under a current download rate is maintained in a predetermined range.

In the method and apparatus for rate adaption of HTTP stream media in the embodiments described above of this invention, the video rate is selected through controlling the degree of saturation of the buffer, so that network bandwidth may be used sufficiently while guaranteeing the contentious and smooth display of the video, and thereby user experience may be improved.

BRIEF DESCRIPTION OF THE DRAWINGS

The accompanying drawings, which are incorporated in and constitute a part of the specification, illustrate embodiments of the invention and, together with the description, serve to explain the principles of the invention, which are by no means limitation to this invention, in which.

DETAILED DESCRIPTION OF THE PREFERRED EMBODIMENT

This invention will be described below in detail with reference to the drawings and embodiments.

Figure 1:
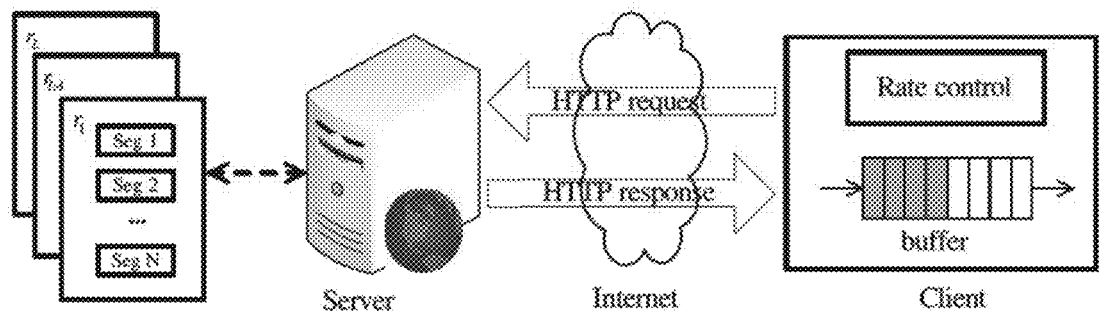
FIG. 1 shows a schematic structural diagram of a dynamic HTTP stream media system according to an embodiment of this invention.

FIG. 1 shows a schematic structural diagram of a dynamic HTTP stream media system according to an embodiment of this invention, comprising: acquiring from a server a stream media with a selected video rate at a client adopting the TCP protocol at its transmission layer and the HTTP protocol at its application layer, wherein the selected video rate allows an amount of buffered data to be maintained in a predetermined range in a buffer for buffering the stream media under a current download rate.

In this embodiment, the video rate is adjusted using an amount of data buffered in a buffer on the client as a feedback signal, which corresponds to adjust download rate according to network bandwidth conditions, so that network bandwidth may be used sufficiently while guaranteeing the contentious and smooth display of the video, and thereby user experience may be improved.

Preferably, the transcoding technology is used on the server to encode a video content into multiple video files with different video rates. Each of the transcoded video files is divided into multiple video segments of a certain length, which are then stored on the server in a form of files. Video segments are downloaded to the client in sequence and are decoded for displaying thereon, particularly, in the following steps:

1. On the server, each video file is transcoded into multiple video files with different video rates (Seg1, Seg2, . . . , SegN in the figure), and then each transcoded video file is further divided into video segments of a certain time length, which are stored on the server in a form of files;

2. the client requests to download the video segments in chronological order;

3. after receiving a video segment on the client, it is decoded and displayed, followed by the download of a next segment;

At step 2, the standard HTTP/TCP protocols are adopted for video transmission. It is necessary to dynamically determine a video rate to select a corresponding video segment when requesting to download a video segment at step 3.

The timing and frequency of adjustment of the video rate will be considered when dynamically determining the video rate.

Timing of adjustment: with larger fluctuations in network bandwidth, a big problem faced in the rate adjustment is how to switch between different video rates in time according to the time-varying bandwidth. A too long adjustment interval may cause rate switch lagging behind changes in bandwidth, and in turn overflow or underflow of the buffer on the receiving side.

Frequency of adjustment: frequent adjustments of the video rate may cause a degraded user experience of watching video. That is to say, rate adjustment should be prevented for short jitters occurred in bandwidth to guarantee a smooth video rate. Thus, in a dynamic HTTP streaming system, how to select an appropriate video rate to improve user experience of watching video has become particularly important.

On the basis of control theory, a method and apparatus for solving the adaption of the rate of timing and frequency adjustment as described above are provided in preferred embodiments of this invention, which will be described in detail below.

First, a definition of some symbols will be given:
$t_k^s$: the timing of the start of downloading the kth segment;
$t_k^e$: the timing of the end of downloading the kth segment;
d(t): the download rate at timing t;
p(t): the playback rate at timing t;
b(t): the amount of data buffered on the receiving side at timing t;
L: the length of each video segment
V={$r_1, r_2, \ldots, r_L$}: a set of available video code rates, satisfying $r_1 < r_3 < \ldots < r_L$
r(k): the video rate selected for the kth segment;
Q(x): a quantification function defined as:

$$Q(x) = \underset{r \in V, r \leq x}{\operatorname{argmax}} r$$

First Preferred Embodiment

Figure 2:
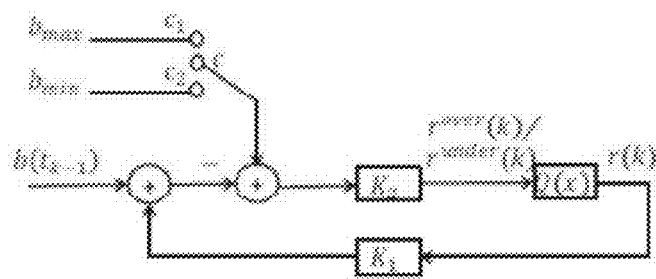
FIG. 2 shows a schematic diagram of proportion control in rate adjustment according to the embodiment of this invention.

The rate adjustment policy of this embodiment is based on proportion control, as shown in FIG. 2, in which $K_1$ and $K_2$ are system parameters, $K_1$ is a feed-forward proportion control parameter of the rate adjustment, $K_2$ is a feedback proportion control parameter of the rate adjustment, and $$\begin{cases} K_1 = \left(1 - \frac{p(t)}{d(t)}\right)L \\ K_1 = \frac{1}{K_2} \end{cases}$$

When d(t)>p(t), contact c is connected to contact c1; when d(t)<p(t), contact c is connected to c2.

When the download of a segment is completed, data buffered in the buffer becomes:

$$b(t_k^e) = b(t_k^s) + \int_{t_k^s}^{t_k^e}(d(t) - p(t))dt$$

Assume that during the download of a segment, the playback rate and download rate are kept unchanged, $$t_k^e - t_k^s = \frac{r(k)}{d(t)}L$$

$$b(t_k^e) = b(t_k^s) + (d(t) - p(t))(t_k^e - t_k^s) = b(t_k^s) + r(k)L\left(1 - \frac{p(t)}{d(t)}\right)$$

In order to realize smooth display of the video, an appropriate video rate must be selected to prevent both buffer overflow and underflow.

Overflow control: when d(t)>p(t), the buffer may be overflowed, causing display exceptions. In order to prevent overflow, $b(t_k^e) \leq b_{max}$ must be satisfied, i.e., the video rate of the kth video segment must satisfy:

$$r(k) \geq \frac{b_{max} - b(t_k^s)}{\left(1 - \frac{p(t)}{d(t)}\right)L}$$

The right side of the above expression is defined as $r^{over}(k)$, representing an upper bound of the rate r(k). When $r^{over}(k) < d(t)$, it means that the selected video rate is less than the download bandwidth, which is unreasonable in practice, because $r^{over}(k)$ is a decreasing function of the buffered data, meaning that there is a larger amount of data buffered, and it is unnecessary to select a video rate that is less than the bandwidth. Thereby, in this case, a sleep mechanism is provided in a preferred embodiment of this invention to consume some buffered date, making $r^{over}(k)$ less than the download bandwidth. Thus, a sleep time may be obtained:

$$t_s = \frac{(d(t) - p(t))L + b(t_k^s) - b_{max}}{p(t)}$$

Underflow control: when d(t)<p(t), the buffer may be underflowed, causing playback freeze. To prevent the occurrence of underflow, $b(t_k^e) \geq b_{min}$ must be satisfied, i.e., the rate of the kth video segment must satisfy:

$$r(k) \leq \frac{b_{min} - b(t_k^s)}{\left(1 - \frac{p(t)}{d(t)}\right)L}$$

The right side of the above expression is defined as $r^{under}(k)$, representing an upper bound of the rate r(k) when the buffer is underflowed. When $r^{under}(k) < r_1$, it means there is no available video rate can prevent buffer underflow. Thus, in this case, a rate resetting strategy is provided in a preferred embodiment of this invention, to directly set the video rate to a lowest rate when $r^{under}(k) < \alpha r_1 (\alpha \geq 1)$:

$$r(k) = r_1$$

In conclusion, the rate adjustment process may be summarized as:

$$r(k) = \begin{cases} Q(r^{over}(k)) & \text{if } d(t) > p(t) \ \& \ r^{over}(k) \geq d(t) \\ Q(r^{under}(k)) & \text{if } d(t) < p(t) \ \& \ r^{under}(k) \geq \alpha r_1 \\ r(k-1) & \text{if } d(t) = p(t) \\ r_1 & \text{else} \end{cases}$$

Wherein, Q(·) represents a quantification function. The above expressions indicate when d(t)>p(t) or d(t)<p(t), an appropriate video rate is selected respectively to prevent buffer overflow and underflow; when d(t)>p(t), a video rate equal to that of the previous video segment is selected as the target video rate; when $r^{under}(k) < \alpha r_1$, the video rate of the video segment is directly set to a lowest video rate.

Second Preferred Embodiment

Figure 3:
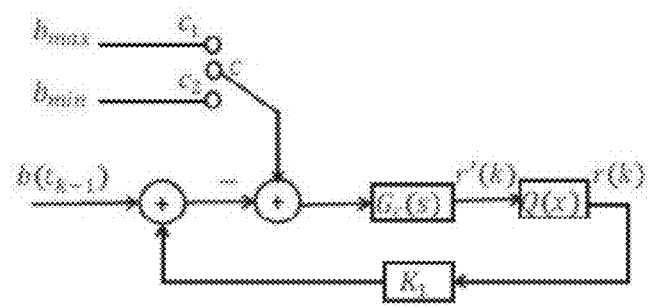
FIG. 3 shows a schematic diagram of proportion differential control in rate adjustment according to the embodiment of this invention.

The above proportion control system generally has stable errors and tends to cause fluctuations in the output video rate. The rate adjustment strategy of the preferred embodiment of this invention is a proportion differential system, i.e., the proportion stage of FIG. 2 is replaced with a proportion differential stage to improve the performance of rate adjustment. As shown in FIG. 3, the proportion differential stage is represented by $G_c(s)$ as follows:

$$G_c(s) = K_p + K_d s$$

Thus, the transfer function of the system is:

$$H(s) = \frac{K_1 G_c(s)}{1 + K_1 G_c(s)} = \frac{K_1 K_p + K_1 K_d s}{1 + K_1 K_p + K_1 K_d s}$$

Wherein, $K_p$ and $K_d$ are system parameters. To guarantee the stability of the system, the poles of the transfer function have to locate on the left side of the s plane, i.e., $$s_p = -\frac{1 + K_1 K_p}{K_1 K_d s} < 0.$$

Thus, $K_p$ and $K_d$ must satisfy the following conditions:

$$\begin{cases} K_p > -\frac{1}{K_1} \\ K_d > 0 \end{cases} \text{ or } \begin{cases} K_p < -\frac{1}{K_1} \\ K_d < 0 \end{cases}$$

Figure 4:
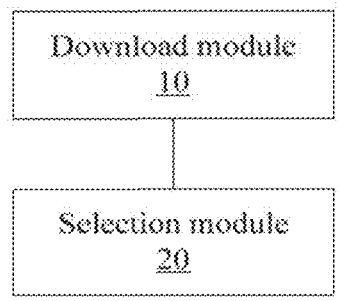
FIG. 4 shows a schematic diagram of an apparatus for rate adaption of HTTP stream media according to the embodiment of this invention.

FIG. 4 shows a schematic diagram of an apparatus for rate adaption of HTTP stream media according to an embodiment of this invention, comprising:

a download module 10 for acquiring from a server a stream media with a selected video rate at a client adopting the TCP protocol at its transmission layer and the HTTP protocol at its application layer;

a selection module 20 for selecting such a video rate that an amount of buffered data in a buffer for buffering the stream media under a current download rate is maintained in a predetermined range.

In the apparatus of this embodiment, network bandwidth may be used sufficiently while guaranteeing the contentious and smooth display of the video, and thereby user experience may be improved.

Preferably, the apparatus further comprises:

an encoding module for encoding each video file into multiple video files with different video rates;

a dividing module for dividing each video file in chronological order into multiple video segments of a predetermined length and storing them on the server as a stream;

the selection module is used to determine a corresponding video rate according to a current download rate and the amount of data in the buffer, after completing the download of the k−1 video segment on the client;

the download module is used to enable the client to acquire a stream of the kth video segment having the corresponding video rate from the server.

Obviously, those skilled in the art should understand that various modules or steps of this invention described above may be implemented by a general computing device, which may be integrated into a single computing device or distributed over a network consisted of multiple computing devices. Optionally, they may be implemented by program code executable by a computing device, such that they may be stored in a storage device for executing by the computing device, or they may be embodied as individual IC (Integral Circuit) modules, or some modules or steps thereof may be implemented in a single IC module. Thus, this invention is not limited to any particular combination of hardware and software.

What are described above are merely preferred embodiments of the present invention, but do not limit the protection scope of the present invention. Various modifications or variations can be made to this invention by persons skilled in the art. Any modifications, substitutions, and improvements within the scope and spirit of this invention should be encompassed in the protection scope of this invention.

What is claimed is:

1. A method for rate adaption of HTTP stream media, comprising:

encoding a video content into multiple video files with different rates in advance, dividing each video file chronologically into multiple video segments of a predetermined length and storing them on the server as the stream acquiring from a server a stream media with a selected video rate at a client adopting the TCP protocol at its transmission layer and the HTTP protocol at its application layer, wherein the selected video rate allows an amount of buffered data to be maintained in a predetermined range in a buffer for buffering the stream media under a current download rate;

wherein acquiring from a server a stream media with a selected video rate at a client adopting the HTTP/TCP protocols comprises:

after the download of the k−1th video segment is completed on the client, determining a corresponding video rate according to a current download rate and the amount of data in the buffer;

acquiring on the client a stream having the corresponding video rate of the kth video segment from the server;

wherein determining a corresponding video rate according to a current download rate and the amount of data in the buffer comprises: setting $$r(k) = \begin{cases} Q(r^{over}(k)) & \text{if } d(t) > p(t) \; \& r^{over}(k) \geq d(t) \\ Q(r^{under}(k)) & \text{if } d(t) < p(t) \; \& r^{under}(k) \geq \alpha r_1 \\ r(k-1) & \text{if } d(t) = p(t) \\ r_1 & \text{else} \end{cases}$$

Wherein, various variables in the expression are defined as follows:

$r^{over}(k)$: an allowed maximum video rate without buffer overflow;

$r^{under}(k)$: an allowed maximum video rate without buffer underflow;

$d(t)$: the download rate at timing t;

$p(t)$: the playback rate at timing t;

$V = \{r_1, r_2, \ldots, r_L\}$: a set of available video rates, meeting $r_1 < r_2 < \ldots < r_L$;

$r(k)$: the video rate selected for the kth segment;

$Q(r^{over}(k))$: a maximum available video rate not greater than $r^{over}(k)$;

$Q(r^{under}(k))$: a maximum available video rate not greater than $r^{under}(k)$.

2. The method of claim 1, characterized in setting:

$$r^{over}(k) = \frac{b_{max} - b(t_k^s)}{\left(1 - \frac{p(t)}{d(t)}\right)L}$$

Wherein, various variables in the expression are defined as follows:
$t_k^s$: the timing of the start of downloading the kth segment;
b(t): the amount of data in the receiving buffer at timing t;
L: the length of each video segment;
$b_{max}$: an allowed overflow quantity of the buffer.

3. The method of claim 1, characterized in setting:

$$r^{under}(k) = \frac{b_{min} - b(t_k^s)}{\left(1 - \frac{p(t)}{d(t)}\right)L}$$

Wherein, $b_{min}$ is an allowed underflow quantity of the buffer.

4. A method for rate adaption of HTTP stream media, comprising:
encoding a video content into multiple video files with different rates in advance, dividing each video file chronologically into multiple video segments of a predetermined length and storing them on the server as the stream media acquiring from a server a stream media with a selected video rate at a client adopting the TCP protocol at its transmission layer and the HTTP protocol at its application layer, wherein the selected video rate allows an amount of buffered data to be maintained in a predetermined range in a buffer for buffering the stream media under a current download rate;
wherein acquiring from a server a stream media with a selected video rate at a client adopting the HTTP/TCP protocols comprises:
after the download of the k−1th video segment is completed on the client, determining a corresponding video rate according to a current download rate and the amount of data in the buffer;
acquiring on the client a stream having the corresponding video rate of the kth video segment from the server;
wherein determining a corresponding video rate according to a current download rate and the amount of data in the buffer comprises:

$r(k) =$ $$\begin{cases} Q\left(K_p * (b_{max} - b(t_k^s)) + K_d \frac{b(t_k^s) - b(t_{k-1}^s)}{t_k^s - t_{k-1}^s}\right) & \text{if } d(t) > p(t) \,\&\, r^{over}(k) \geq d(t) \\ Q\left(K_p * (b_{min} - b(t_k^s)) + K_d \frac{b(t_k^s) - b(t_{k-1}^s)}{t_k^s - t_{k-1}^s}\right) & \text{if } d(t) < p(t) \,\&\, r^{under}(k) \geq \alpha r_1 \\ r(k-1) & \text{if } d(t) = p(t) \\ r_1 & \text{else} \end{cases}$$

Wherein, various variables in the expression are defined as follows:
$r^{over}(k)$: an allowed maximum video rate without buffer overflow;

$$r^{over}(k) = \frac{b_{max} - b(t_k^s)}{\left(1 - \frac{p(t)}{d(t)}\right)L};$$

$r^{under}(k)$: an allowed maximum video rate without buffer underflow;

$$r^{under}(k) = \frac{b_{min} - b(t_k^s)}{\left(1 - \frac{p(t)}{d(t)}\right)L};$$

d(t): the download rate at timing t;
p(t): the playback rate at timing t;
V={$r_1, r_2, \ldots, r_L$}: a set of available video rates, meeting $r_1 < r_2 < \ldots < r_L$;
r(k): the video rate selected for the kth segment;
Q($r^{over}(k)$): a maximum available video rate not greater than $r^{over}(k)$;
Q($r^{under}(k)$): a maximum available video rate not greater than $r^{under}(k)$;
$t_k^s$: the timing of the start of downloading the kth segment;
b(t): the amount of data in the receiving buffer at timing t;
$b_{max}$: an allowed overflow quantity of the buffer;
$b_{min}$: an allowed underflow quantity of the buffer;
$K_p$ and $K_d$ are setting parameters.

5. The method of claim 4, characterized in setting:

$$\begin{cases} K_p > -\frac{1}{K_1} \\ K_d > 0 \end{cases} \text{ or } \begin{cases} K_p < -\frac{1}{K_1} \\ K_d < 0 \end{cases} \text{Wherein}$$

$$\begin{cases} K_1 = \left(1 - \frac{p(t)}{d(t)}\right)L \\ K_1 = \frac{1}{K_2} \end{cases}.$$

* * * * *